United States Patent [19]

Phillips et al.

[11] Patent Number: 5,096,145

[45] Date of Patent: Mar. 17, 1992

[54] AIRCRAFT DEICING APPARATUS AND METHOD

[75] Inventors: David L. Phillips, Casselberry; Clifton L. Foster, Kissimmee, both of Fla.

[73] Assignee: FMC Corporation, Chicago, Ill.

[21] Appl. No.: 474,386

[22] Filed: Feb. 5, 1990

[51] Int. Cl.$^5$ .............................................. B64D 15/00
[52] U.S. Cl. .................... 244/134 R; 244/134 C
[58] Field of Search ..................... 244/134 R, 134 C

[56] References Cited

U.S. PATENT DOCUMENTS

| | | | |
|---|---|---|---|
| 4,191,348 | 3/1980 | Holwerda | 244/134 R |
| 4,197,712 | 4/1980 | Zwick et al. | 244/134 R |
| 4,842,005 | 6/1989 | Hope et al. | 244/134 C |

Primary Examiner—Joseph F. Peters, Jr.
Assistant Examiner—Virna L. Mojica
Attorney, Agent, or Firm—J. Preston Oxenham; Richard B. Megley

[57] ABSTRACT

An apparatus and method for applying a heated mixture of propylene glycol based aircraft deicing fluid and water to an aircraft. Propylene glycol based aircraft deicing fluid is heated by means of a directly fired combustion heater. The heated aircraft deicing fluid is mixed with hot water to form a deicing mixture for deicing aircraft. Diaphragm type positive displacement pumps, having controllable volumetric outputs, combine the heated aircraft deicing fluid and the heated water in a desired ratio. The volumetric outputs of the pumps can be varied to achieve a desired proportion of aircraft deicing fluid to water.

4 Claims, 3 Drawing Sheets

FIG_1 (PRIOR ART)

FIG_2

AIRCRAFT DEICING APPARATUS AND METHOD

BACKGROUND OF THE INVENTION

This invention relates generally to aircraft deicing apparatus and methods and, more particularly, to apparatus and methods for applying heated propylene glycol based aircraft deicing fluids to aircraft.

The accumulation of snow or ice on the wing, tail and other surfaces of an aircraft can drastically degrade the aerodynamic performance of the aircraft. Accordingly, various apparatus and methods have been developed for removing accumulated snow and ice from critical aircraft surfaces as well as for preventing the further accumulation of snow or ice.

One well known anti-icing technique involves an application of a heated ethylene glycol based or Type I, aircraft deicing fluid ("ADF") to the aircraft. The heated Type I ADF melts the accumulated ice and snow and, because of its solubility in water and its low melting point, helps prevent the melted ice and snow from refreezing. Although effective in removing accumulated ice and snow immediately before take off, heated Type I ADF is largely ineffective in preventing further icing for more than a brief period. Accordingly, it is not well suited for protecting aircraft that will remain on the ground in icing conditions for several minutes or hours following deicing.

To provide effective protection against the accumulation of ice and snow when an aircraft stands idle for more than brief periods in icing conditions, propylene glycol based, or Type II, aircraft deicing fluids have been developed. These commercially available Type II ADF's typically include various additives that enhance the pseudo-plastic nature of the propylene glycol fluid. The result is a viscous ADF that, when used alone or in solution with water, forms an adherent, protective film on aircraft surfaces that guards against the further accumulation of snow and ice while the aircraft is stationary, but that loses viscosity and shears away from the surfaces under the shearing force of the relative wind during the takeoff roll.

Like Type I ADF, Type II ADF can be heated to permit the removal of already accumulated ice and snow from an aircraft. However, because of its complex chemical structure and the presence of the various chemical additives, Type II ADF is easily damaged by excessive heat. Care must be taken to avoid damaging the fluid during heating. Heretofore, indirectly heated fluid-to-fluid heat exchangers have been used to ensure that the Type II ADF is heated uniformly without any "hot spots" that can cause localized burning or degradation of the Type II ADF. Although effective, such heat exchangers are complicated, expensive, prone to breakdown and difficult to repair.

In view of the foregoing, it is a general object of the present invention to provide a new and improved apparatus and method for applying heated Type II ADF to an aircraft.

It is a further object of the present invention to provide a new and improved apparatus and method for applying heated Type II ADF to an aircraft wherein degradation of the Type II ADF during and after heating is avoided.

It is a still further object of the present invention to provide a new and improved, heated, Type II ADF deicing apparatus and method that is simple, reliable and economical in construction and operation.

It is a still further object of the present invention to provide a new and improved, heated, Type II ADF deicing apparatus and method that does not involve the use of indirectly fired, fluid-to-fluid heat exchangers.

SUMMARY OF THE INVENTION

The invention provides an apparatus for applying a propylene glycol based aircraft deicing fluid to an aircraft. The apparatus includes a first reservoir for storing the aircraft deicing fluid and a combustion heater in fluid communication with the first reservoir for heating the aircraft deicing fluid. A second reservoir is provided for containing heated water. A proportional mixing system is provided for mixing the heated aircraft deicing fluid with the heated water in a desired predetermined proportion.

The invention also provides a method of preparing a heated, aircraft deicing solution that comprises a mixture of propylene glycol based aircraft deicing fluid and water in predetermined proportions. The method includes the steps of heating a quantity of substantially undiluted, propylene glycol based aircraft deicing fluid in a combustion heater and mixing the heated, substantially undiluted aircraft deicing fluid with heated water sufficient to achieve the predetermined proportions.

In one embodiment, the heated, undiluted, propylene glycol based aircraft deicing fluid and the heated water are pumped by means of separate diaphragm type positive displacement pumps, and the volumetric outputs of the pumps are maintained in a predetermined ratio relative to each other so as to achieve the desires proportion of aircraft deicing fluid to water in the final mixture.

In one embodiment, the magnitudes of the volumetric outputs of the diaphragm type positive displacement pumps are adjusted to achieve a desired overall flow rate while maintaining the desired proportion of aircraft deicing fluid to water in the final mixture.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements and wherein:

DESCRIPTION OF THE PREFERRED EMBODIMENT

Figure 1:
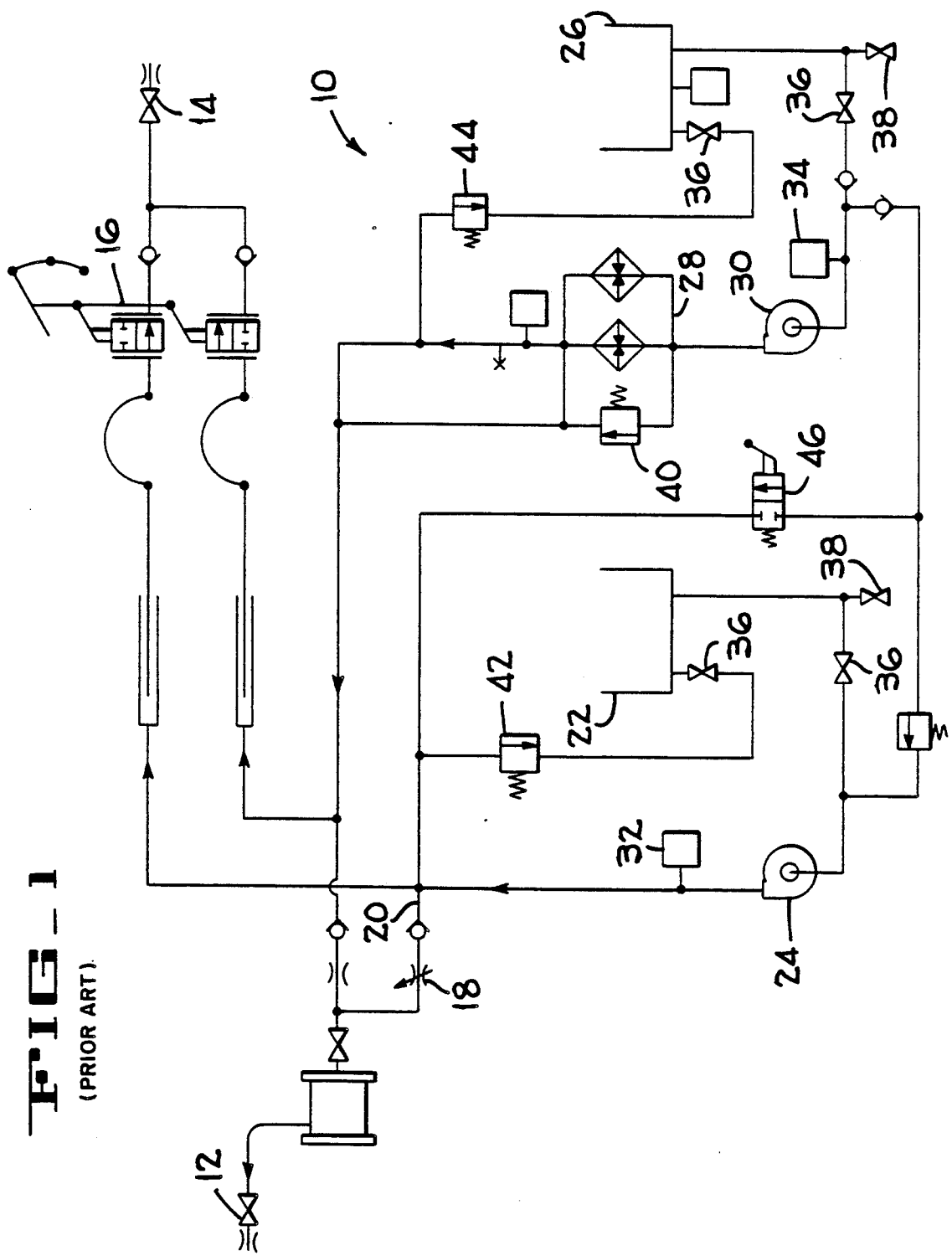
FIG. 1 is a schematic flow diagram of a prior art apparatus for applying a heated Type I ADF and water mixture to an aircraft.

A prior art apparatus 10 for applying Type I (ethelyene glycol based) ADF is shown in FIG. 1. The apparatus 10 is preferably installed within a deicing vehicle, such as a truck, that can be driven to the location of the aircraft to be deiced. As illustrated, the apparatus includes a ground nozzle 12 that can be used for deicing those areas of the aircraft, such as the undercarriage and the undersides of the wing and tail surfaces, that are accessible from the ground. In addition, a basket nozzle 14, operable from a basket carried at the end of an extendable boom, is provided for deicing the upper wing, tail and fuselage surfaces that cannot conveniently be reached by the ground nozzle 12. A proportioning valve 16 of known construction is provided in conjunction with the boom nozzle 14 for enabling the operator to select the proportion of ADF to water in the deicing solution sprayed from the boom nozzle 14. A variable flow restrictor 18, provided in the supply conduit 20 for supplying undiluted ADF to the ground nozzle 12, controls the proportion of ADF to water in the solution delivered by the ground nozzle.

The prior art apparatus 10 further includes a first reservoir or ADF storage tank 22 for containing the ADF in substantially undiluted form. The ADF is heated by means of an indirectly fired, fluid-to-fluid heat exchanger (not shown) to a typical temperature of approximately of 185° F. and is circulated from the ADF storage tank 22 by means of a centrifugal pump 24.

The prior art apparatus 10 further includes a second reservoir or water storage tank 26 for containing hot water. The water in the water storage tank 26 is heated to approximately 185° F. by means of a fuel fired combustion heater 28. The hot water is circulated from the water storage tank and through the combustion heater 28 by means of a centrifugal pump 30.

The first and second centrifugal pumps 24, 30 also function, respectively, to supply the hot ADF and the hot water to the ground and boom nozzles 12, 14. First and second flow sensors 32, 34 are provided in conjunction with the first and second centrifugal pumps 24, 30 to provide a warning in the event fluid flow through the pumps is, for some reason, not present. A plurality of valves 36 are provided for isolating both the ADF and hot water storage tanks 22, 26. In addition, drain valves 38 are provided for draining the tanks 22, 26. A pressure relief valve 40 provides a bypass around the combustion heater 28 in the event of a blockage. Two additional pressure relief valves 42, 44 are provided for recirculating the hot ADF and the hot water, respectively, to their respective storage tanks 22, 26 when neither the ground nozzle 12 nor boom nozzle 14 is open. A purge valve 46 is provided for purging water from the system to prevent freezing while the apparatus 10 is not in use.

Figure 2:
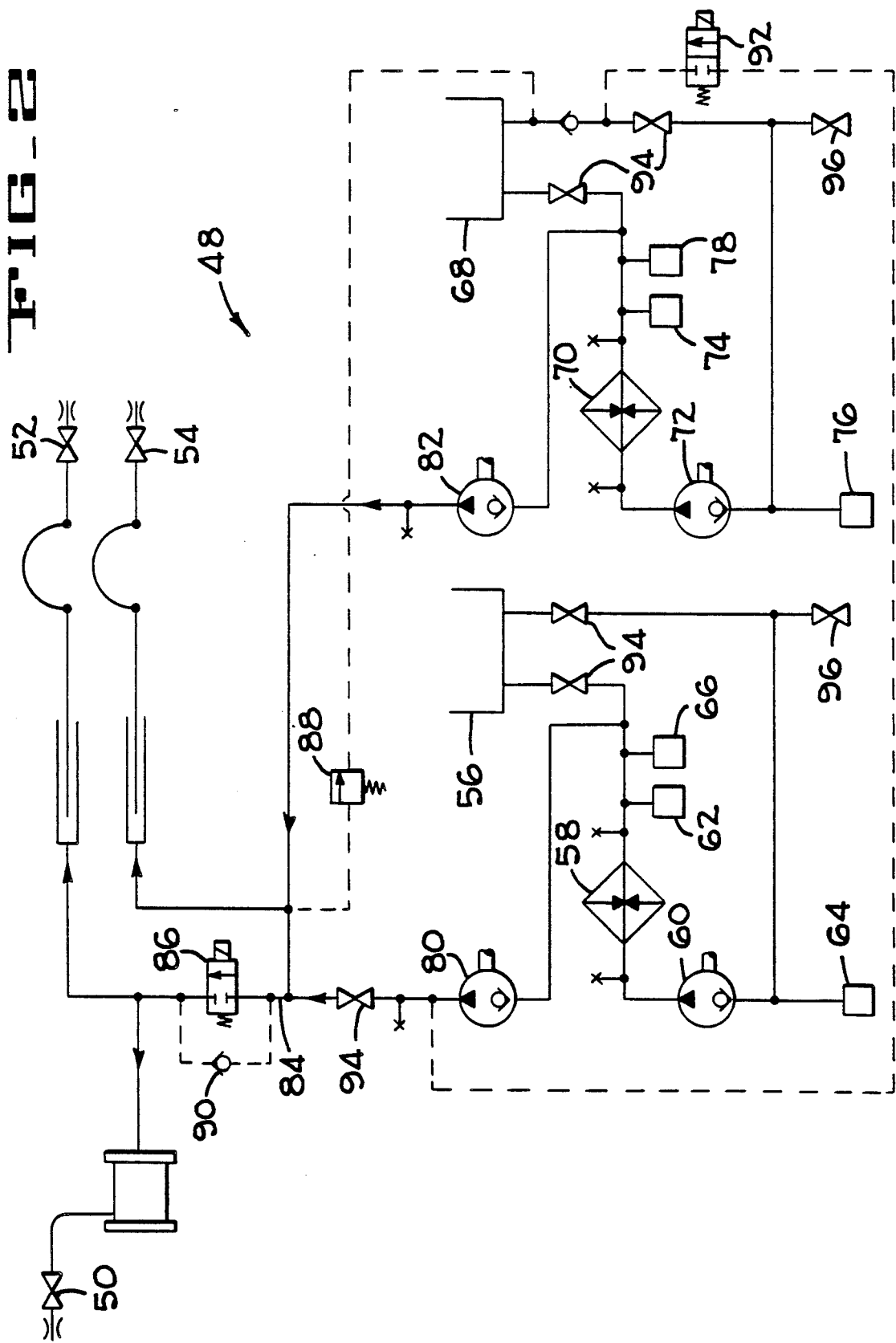
FIG. 2 is a schematic flow diagram of an apparatus embodying various features of the invention for applying a heated Type II ADF and water mixture to an aircraft.

A deicing apparatus 48 embodying various features of the invention is illustrated in FIG. 2. The apparatus 48 operates to heat Type II (propylene glycol based) aircraft deicing fluid and to mix the heated Type II ADF with hot water to create a heated solution or mixture having a predetermined proportion of ADF to water.

As illustrated, the apparatus 48 includes a ground nozzle 50 for use from the ground and a pair of additional basket nozzles 52, 54 operable from a basket carried at the end of an extendable boom. One of the basket nozzles 52 provides a relatively low flow rate (e.g. 20 gallons per minutes (gpm)) for deicing relatively low surfaces, while the other basket nozzle 54 provides a greater flowrate (e.g. 40–120 gpm) for deicing larger surfaces.

The deicing apparatus includes a first reservoir or hot ADF storage tank 56 for storing heated, substantially undiluted, Type II ADF. The ADF is heated by means of a fuel fired combustion heater 58 such as a two pass combustion heater of known construction. The ADF is circulated through the combustion heater 58 by means of a first heater circulation pump 60, which preferably comprises a diaphragm type positive displacement pump. Undiluted ADF is drawn from the ADF storage tank 56 by the pump 60 and is circulated through the combustion heater 58 back to the tank 56. A flow sensor 62 verifies that ADF is being circulated by the pump 60, and a pair of temperature sensors 64, 66 monitor the temperature of the ADF on both sides of the combustion heater 58.

The hot water is contained in a second reservoir or hot water storage tank 68 and is heated by means of a second combustion heater 70 that preferably also comprises a two pass combustion heater of known construction. A second heater circulation pump 72, which also preferably comprises a diaphragm type positive displacement pump, draws water from the hot water storage tank 68 and circulates the water through the combustion heater 70 back to the tank 68. An additional flow sensor 74 verifies the circulation of hot water, and a pair of additional temperature sensors 76, 78 sense the water temperature on both sides of the combustion heater 70. Typically, the water in the tank 68 is maintained at approximately 185° F.

To control the ratio of ADF to water in the deicing mixture discharged by the nozzles 50, 52, 54, the apparatus 48 includes proportional mixing means for mixing the heated ADF with the heated water in a desired, predetermined proportion. In the illustrated embodiment, the proportional mixing means includes a first fluid delivery pump 80, which preferably comprises a diaphragm type positive displacement pump, having its input connected to the outlet side of the ADF combustion heater 58 and having its output coupled to the nozzles 50, 52, 54. The proportional mixing means further includes a second fluid delivery pump 82, which also preferably comprises a diaphragm type positive displacement pump, having its input connected to the outlet side of the water combustion heater 70 and having its output also connected, through a common conduit 84, to the nozzles 80, 82. The volumetric outputs of the ADF and hot water fluid delivery pumps 80, 82 are independently controlable so that the ratio of hot ADF delivered by the ADF fluid delivery pump 80 to hot water delivered by the hot water fluid delivery pump 82 can be controlled to achieve a desired proportion of ADF to water in the deicing mixture delivered by the nozzles 50, 52, 54. Similarly, the quantity or flow rate of the combined ADF and water delivered by the nozzles 50, 52, 54 can be controlled by controlling the magnitude of the volumetric outputs of the ADF and water fluid delivery pumps 80, 82 while maintaining the desired ratio between their volumetric outputs.

The ground nozzle 50 and the low flow rate basket nozzle 52 are enabled by means of a solenoid operated enable valve 86 in the common fluid conduit 84 leading from the combined outputs of the ADF and water fluid delivery pumps 80, 82 to the nozzles 50, 52. A pressure relief valve 88, coupled between the combined outputs of the ADF and hot water fluid delivery pumps 80, 82 and the hot water storage tank 68, provides a drain path for the combined ADF and water when the boom is retracted. A check valve 90 across the enable valve 86 provides a drainage path in the event the boom is retracted while the enable valve 86 is closed. A solenoid operated purge valve 92 coupled between the output of the ADF fluid delivery pump 80 and the hot water storage 68 tank allows the operator to purge the fluid conduits leading to the various nozzles 50, 52, 55. A plurality of additional valves 94 provide for controlled isolation of the various system components. Drain valves 96 are provided for draining the ADF and hot water storage tanks 56, 68.

Figure 3:
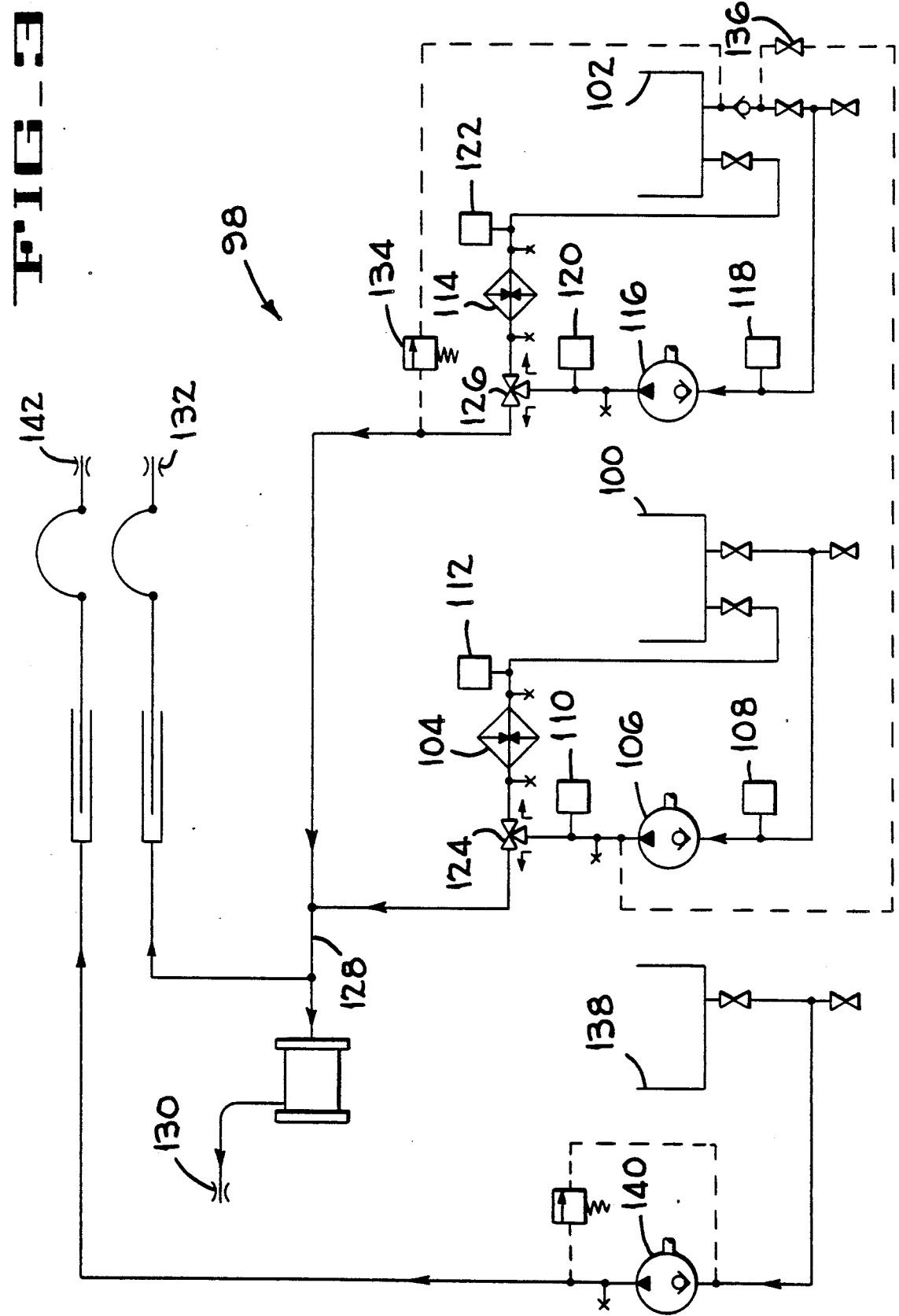
FIG. 3 is a schematic flow diagram of another apparatus embodying various features of the invention for applying a heated ADF and water mixture to an aircraft.

Another Type II ADF deicing apparatus 98 is illustrated in FIG. 3. In this apparatus, a first reservoir or hot ADF storage tank 100 is provided for storing the substantially undiluted Type II ADF, and a second reservoir or hot water storage tank 102 is provided for storing hot water. In accordance with one aspect of the invention, a fuel fired combustion heater 104, which preferably comprises a two pass combustion heater of known construction, is provided for heating the ADF, and a diaphragm type positive displacement pump 106 is provided for circulating the substantially undiluted ADF from the ADF storage tank 100, through the ADF combustion heater 104, and back to the tank 100. A flow sensor 108 verifies the circulation of ADF, and a pair of temperature sensors 110, 112 sense the temperature of the ADF on both sides of the combustion heater 104.

The water is heated by means of an additional combustion heater 114 which also preferably comprises a two pass combustion heater of known construction. Water from the hot water storage tank 102 is circulated through the water combustion heater 114 by means of an additional pump 116 which also preferably comprises a diaphragm type positive displacement pump. A flow sensor 118 verifies the circulation of hot water, and a pair of temperature sensors 120, 122 sense the temperature of the water on both sides of the combustion heater 114.

In contrast to the apparatus shown in FIG. 2, proportional mixing of the hot ADF and hot water does not require the use of additional pumps but, rather, is provided by the same pumps 106, 116 that circulate the ADF and the water through their respective combustion heaters 104, 114. To this end, a first three way valve 124 is provided in the fluid conduit leading from the output of the ADF pump 106, and a second three way valve 126 is provided in the fluid conduit leading from the output of the water pump 116. The first three way valve 124 is operable to direct the output of the ADF pump 106 to either the ADF combustion heater 104 or to a common conduit 128 leading to a pair of ground and boom nozzles 130, 132. The second three way valve 126 is operable to direct hot water to either the water combustion heater 114 or the common conduit 128. Accordingly, when the three way valves 124, 126 are both in one position, the outputs of the ADF and water pumps 106, 116 are combined and delivered to the nozzles 130, 132. When the valves 124, 126 are in the other position, the ADF and the water are circulated through their respective heaters 104, 114 and returned to their respective storage tanks. 100, 102, unmixed.

Proporational mixing of the ADF and water is achieved by controlling the volumetric outputs of the respective ADF and water pumps 106, 116 so as to achieve a desired ratio of ADF to water. Similarly, the magnitudes of the volumetric outputs are controlled to achieve the desired flow rate at the desired proportion of ADF to water.

A pressure relief valve 134 is provided for returning the combined ADF and water to the water storage tank 102 when the boom is retracted. A purge valve 136 is provided for purging the mixture from the nozzle lines when the apparatus is not in use.

An additional storage tank 138 for unheated ADF, along with an additional diaphragm type positive displacement pump 140 and an aditional basket mounted nozzle 142, provide the availability of cold ADF when it is not neccessary to melt a previous accumulation of snow and ice.

The apparatus and method of the present invention, and in particular, the use of directly fired combustion heaters, provides a deicing apparatus that is simpler and more reliable in construction and operation than prior units that employed indirectly fired, fluid-to-fluid heat exchangers. It has been found that the use of directly fired combustion heaters for heating Type II ADF does not result in significant degradation of the Type II ADF and, thus, permits the apparatus and method herein disclosed to exploit the advantages of combustion type heaters.

Although specific configurations of the aircraft deicing apparatus have been disclosed, it will be appreciated that other configurations can be employed. Similarly, while specific positive displacement pumps and specific combustion heater configurations have been described, other positive displacement pumps and combustion heaters may by substituted. Similarly, the specific flow rates and temperatures herein described are meant to be illustrative rather than limiting.

While a particular embodiment of the invention has been shown and described, it will be obvious of those skilled in the art that changes and modifications may be made without departing from the invention in its broader aspects, and, therefore, the aim in the appended claims is to cover all such changes and modifications as fall within the true spirit and scope of the invention.

We claim:

1. An apparatus for applying a mixture of a propylene glycol based aircraft deicing fluid and water to an aircraft comprising:

a first storage tank for holding the propylene glycol based aircraft deicing fluid in substantially undiluted form;

a two pass combustion heater;

a first diaphragm type positive displacement pump operable to pump the aircraft deicing fluid from said first storage tank and through said two pass combustion heater;

a second storage tank for holding the water;

a water heater;

a second diaphragm type positive displacement pump operable to pump the water from said second storage tank and through said water heater; and proportional mixing means for mixing the heated aircraft deicing fluid and the heated water in a desired ratio to achieve a predetermined desired proportion of aircraft deicing fluid to water in the mixture to be applied to the aircraft including a common conduit for mixing aircraft deicing fluid and water, a first three way valve in fluid communication with output of said first diaphragm type positive displacement pump for controllably diverting the output of said first diaphragm type positive displacement pump to said common conduit, and a second three way valve in fluid communication with the output of said second diaphragm type positive displacement pump for controllably diverting the output of said second diaphragm type positive displacement pump to said common conduit.

2. An apparatus for applying a propylene glycol based aircraft deicing fluid to an aircraft comprising:
a first reservoir for storing the aircraft deicing fluid;
a combustion heater in fluid communication with said first reservoir for heating the aircraft deicing fluid;
a second reservoir for containing heated water;
a first fluid pump for pumping the aircraft deicing fluid;
a second fluid pump for pumping the water; and,
proportional mixing means for mixing the heated aircraft deicing fluid with the heated water in a desired predetermined proportion including a common conduit for mixing the aircraft deicing fluid and the water, a first three way valve in fluid communication with output of said first pump for controllably diverting the output of said first pump to said common conduit, and a second three way valve in fluid communication with the output of said second pump for controllably diverting the output of said second pump to said common conduit.

3. The apparatus for applying a propylene glycol based aircraft deicing fluid to an aircraft of claim 2 in which said first pump is a diaphragm type positive displacement pump.

4. The apparatus for applying a propylene glycol based aircraft deicing fluid to an aircraft of claim 3 in which said second pump is a diaphragm type positive displacement pump.

* * * * *